(12) United States Patent
Lyons et al.

(10) Patent No.: US 11,765,143 B2
(45) Date of Patent: Sep. 19, 2023

(54) SYSTEMS AND METHODS FOR SECURING VIDEOCONFERENCING MEETINGS

(71) Applicant: Zoom Video Communications, Inc., San Jose, CA (US)

(72) Inventors: Karan Lyons, Los Angeles, CA (US); Simon Booth, Livermore, CA (US)

(73) Assignee: Zoom Video Communications, Inc., San Jose, CA (US)

( * ) Notice: Subject to any disclaimer, the term of this patent is extended or adjusted under 35 U.S.C. 154(b) by 154 days.

(21) Appl. No.: 17/327,248

(22) Filed: May 21, 2021

(65) Prior Publication Data

US 2022/0377057 A1    Nov. 24, 2022

(51) Int. Cl.
    *H04L 29/00* (2006.01)
    *H04L 9/40* (2022.01)
    *H04L 12/18* (2006.01)

(52) U.S. Cl.
    CPC ...... *H04L 63/0442* (2013.01); *H04L 12/1818* (2013.01); *H04L 63/083* (2013.01); *H04L 63/1433* (2013.01)

(58) Field of Classification Search
    CPC ............. H04L 63/0442; H04L 12/1818; H04L 63/083; H04L 63/1433; H04L 2463/061;
    (Continued)

(56) References Cited

U.S. PATENT DOCUMENTS

| | | | | |
|---|---|---|---|---|
| 4,467,140 A | * | 8/1984 | Fathauer | H04M 1/72505 455/411 |
| 6,254,000 B1 | * | 7/2001 | Degen | G06Q 20/40 235/379 |

(Continued)

FOREIGN PATENT DOCUMENTS

| | | | | |
|---|---|---|---|---|
| CN | 109889763 B | * | 12/2020 | |
| CN | 110190964 B | * | 3/2022 | .......... H04L 63/045 |
| CN | 114697955 A | * | 7/2022 | |

OTHER PUBLICATIONS

R. Lal and P. M. Pappachan, "An architecture methodology for secure video conferencing," 2013 IEEE International Conference on Technologies for Homeland Security (HST), 2013, pp. 460-466, doi: 10.1109/THS.2013.6699048. (Year: 2013).*

(Continued)

*Primary Examiner* — Don G Zhao
(74) *Attorney, Agent, or Firm* — Kilpatrick Townsend & Stockton LLP

(57) ABSTRACT

One disclosed example involves a client device joining a videoconferencing meeting in which there is end-to-end encryption, where the end-to-end encryption is implemented by the client devices participating in the meting using a meeting key provided by the meeting host. Thereafter, the client device receives a public key of an asymmetric key pair corresponding to the host of the meeting, where the public key is different from the meeting key. The client device then generates a security code based on the public key and output the security code on a display device. The security code can be compared to another security code generated by another client device participating in the meeting to verify if the meeting is secure. The client device may also receive encrypted videoconferencing data, decrypt it using the meeting key, and output the decrypted videoconferencing data on the display device.

20 Claims, 5 Drawing Sheets

(58) Field of Classification Search
CPC ............ H04L 2463/062; H04L 9/0825; H04L 9/0833; H04L 9/0863; H04L 9/3228; H04L 9/40; H04L 63/00; H04L 63/0435; H04L 63/045; H04L 63/062; H04L 63/065; H04L 63/0869
See application file for complete search history.

(56) References Cited

U.S. PATENT DOCUMENTS

| | | | | |
|---|---|---|---|---|
| 7,346,171 B2* | 3/2008 | Numao | ................ | H04L 9/3013 |
| | | | | 713/169 |
| 7,698,745 B2* | 4/2010 | Pauker | ................ | H04L 9/3073 |
| | | | | 713/165 |
| 10,659,232 B2* | 5/2020 | Kim | ........................ | H04L 9/14 |
| 11,172,006 B1* | 11/2021 | Ashkenazi | ............ | G06F 21/604 |
| 11,418,960 B1* | 8/2022 | Hanika | ............... | H04W 12/037 |
| 2001/0050990 A1* | 12/2001 | Sudia | .................... | G06Q 20/02 |
| | | | | 380/278 |
| 2003/0074552 A1* | 4/2003 | Olkin | .................... | H04L 63/062 |
| | | | | 713/150 |
| 2003/0081789 A1* | 5/2003 | Numao | ................... | H04L 9/085 |
| | | | | 380/278 |
| 2004/0148500 A1* | 7/2004 | Olkin | ...................... | H04L 51/23 |
| | | | | 713/150 |
| 2006/0020796 A1* | 1/2006 | Aura | ..................... | H04L 9/3236 |
| | | | | 713/168 |
| 2007/0040019 A1* | 2/2007 | Berghel | ................... | G06K 7/08 |
| | | | | 235/449 |
| 2007/0271596 A1* | 11/2007 | Boubion | ................. | G06F 21/77 |
| | | | | 726/3 |
| 2015/0100785 A1* | 4/2015 | Joye | ........................ | H04L 9/008 |
| | | | | 713/168 |
| 2015/0287416 A1* | 10/2015 | Brands | .................. | H04L 9/3231 |
| | | | | 704/273 |
| 2016/0088259 A1* | 3/2016 | Anderson | .............. | H04N 7/157 |
| | | | | 348/14.03 |
| 2017/0034160 A1* | 2/2017 | Brands | ..................... | H04M 3/56 |
| 2017/0346851 A1* | 11/2017 | Drake | ................... | H04L 9/0838 |
| 2019/0116167 A1* | 4/2019 | Johnson | ................ | H04L 9/0825 |

OTHER PUBLICATIONS

EP International Search Report and Written Opinion for PCT/US2022/028498 dated Aug. 25, 2022.
Blum et al., "E2E Encryption for Zoom Meetings", https://github.com/zoom/zoom-e2e-whitepaper/raw/master/archive/zoom_e2e_v3.pdf, Dec. 15, 2020; pp. 1-55.
Isobe et al., "Security Analysis of End-to-End Encryption for Zoom Meetings", IACR, International Association for Cryptologic Research, vol. 20210416:1116334, Apr. 15, 2021; pp. 1-24.

* cited by examiner

SYSTEMS AND METHODS FOR SECURING VIDEOCONFERENCING MEETINGS

TECHNICAL FIELD

The present application generally relates to hosting or participating in video conferences and more particularly relates to systems and methods for securing videoconferencing meetings.

BACKGROUND

Videoconferencing has become a common way for people to meet as a group, but without being at the same physical location. Participants can be invited to a video conference meeting, join from their personal computers or telephones, and are able to see and hear each other and converse largely as they would during an in-person group meeting or event. The advent of user-friendly video conferencing software has enabled teams to work collaboratively despite being dispersed around the country or the world. It has also enabled families and friends to engage with each other in more meaningful ways, despite being physically distant from each other.

SUMMARY

Various examples are described for systems and methods for securing videoconferencing meetings. One example of the present disclosure includes method comprising joining, by a client device, a videoconferencing meeting in which there is end-to-end encryption between client devices participating in the videoconferencing meeting, wherein the end-to-end encryption is implemented between the client devices using a meeting key provided by a host of the videoconferencing meeting; after joining the videoconferencing meeting, receiving, by the client device, a public key of an asymmetric key pair corresponding to the host of the videoconferencing meeting, the public key being different from the meeting key; generating, by the client device, a security code based on the public key; outputting, by the client device, the security code on a display device for comparison to another security code generated by another client device participating in the videoconferencing meeting to verify that the videoconferencing meeting is secure; receiving, by the client device, encrypted videoconferencing data from one or more of the client devices participating in the videoconferencing meeting; and decrypting, by the client device, the encrypted videoconferencing data using the meeting key and outputting the decrypted videoconferencing data on the display device.

Another example of the present disclosure includes a client device comprising a display device; a processor communicatively coupled to the display device; and a non-transitory computer-readable medium comprising program code for a videoconferencing application. The videoconferencing application is executable by the processor to: join a videoconferencing meeting in which there is end-to-end encryption between client devices participating in the videoconferencing meeting, wherein the end-to-end encryption is implemented between the client devices using a meeting key provided by a host of the videoconferencing meeting; after joining the videoconferencing meeting, receive a public key of an asymmetric key pair corresponding to the host of the videoconferencing meeting, the public key being different from the meeting key; generate a security code based on the public key; output the security code on a display device for comparison to another security code generated by another client device participating in the videoconferencing meeting to verify that the videoconferencing meeting is secure; receive encrypted videoconferencing data from one or more of the client devices participating in the videoconferencing meeting; and decrypt the encrypted videoconferencing data using the meeting key and output the decrypted videoconferencing data on the display device.

Yet another example of the present disclosure includes a non-transitory computer-readable medium comprising program code that is executable by a processor of a client device to cause the processor to: join a videoconferencing meeting in which there is end-to-end encryption between client devices participating in the videoconferencing meeting, wherein the end-to-end encryption is implemented between the client devices using a meeting key provided by a host of the videoconferencing meeting; after joining the videoconferencing meeting, receive a public key of an asymmetric key pair corresponding to the host of the videoconferencing meeting, the public key being different from the meeting key; generate a security code based on the public key; output the security code on a display device for comparison to another security code generated by another client device participating in the videoconferencing meeting to verify that the videoconferencing meeting is secure; receive encrypted videoconferencing data from one or more of the client devices participating in the videoconferencing meeting; and decrypt the encrypted videoconferencing data using the meeting key and output the decrypted videoconferencing data on the display device.

These illustrative examples are mentioned not to limit or define the scope of this disclosure, but rather to provide examples to aid understanding thereof. Illustrative examples are discussed in the Detailed Description, which provides further description. Advantages offered by various examples may be further understood by examining this specification.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Figure 1:
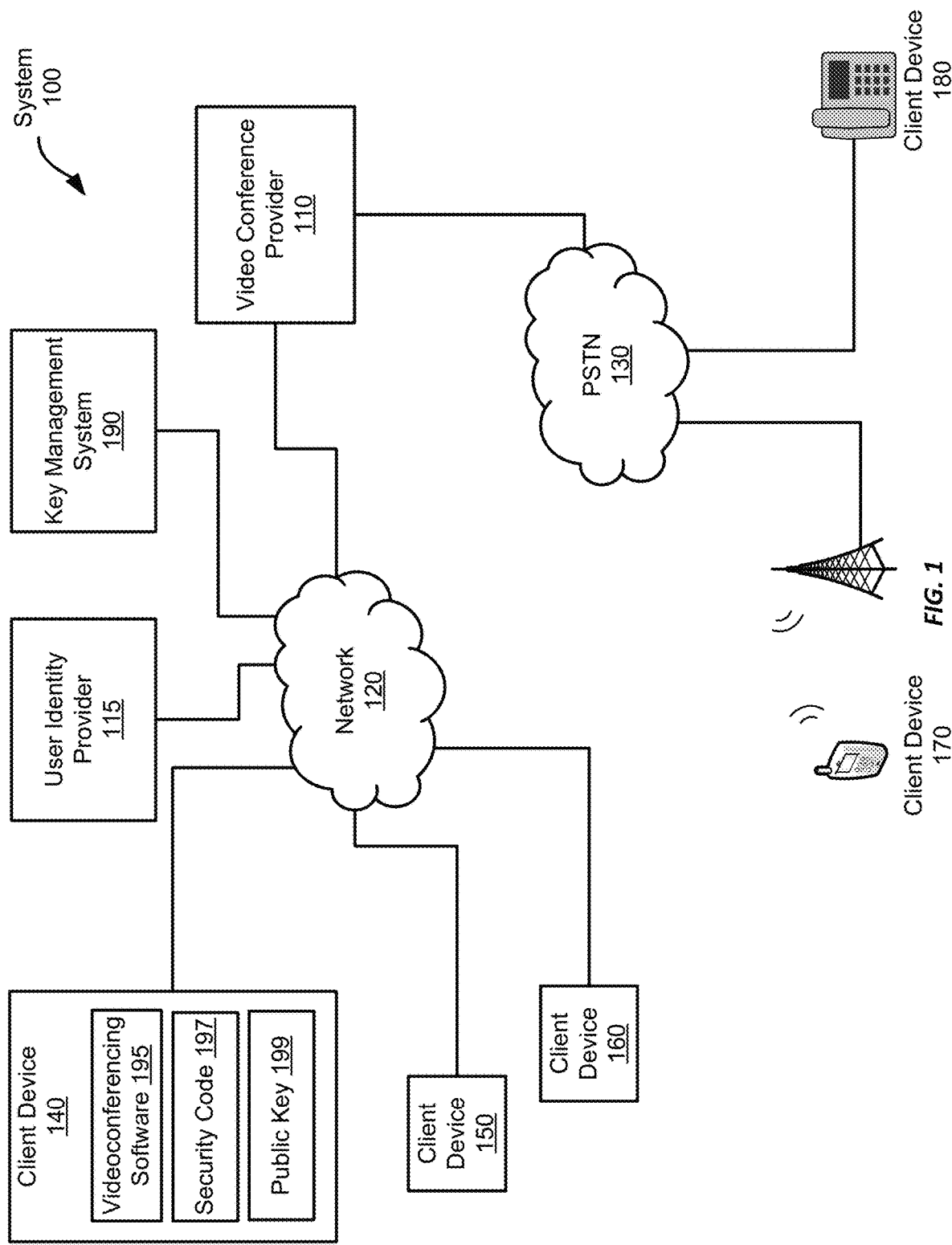
FIGS. 1-3 shows examples of systems for providing videoconferencing functionality to various client devices according to some aspects of the present disclosure.

Examples are described herein in the context of systems and methods for securing videoconference meetings, for example against interception or hijacking by a malicious actor. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Videoconferencing systems enable their users to create and attend videoconferences (or "meetings") via various types of client devices. After joining a meeting, the participants receive audio and video streams or feeds from the other participants and are presented with views of the video feeds from one or more of the other participants and audio from the audio feeds. Using these different modalities, the participants can see and hear each other, engage more deeply, and generally have a richer experience despite not being physically in the same space.

To create a meeting, a person (referred to as the "leader" or "host") accesses the videoconferencing system, creates a new meeting, and identifies one or more other people to invite to the meeting. In response to the host creating the meeting, the videoconference system establishes the meeting by creating a meeting identifier and, if desired, a passcode or other access control information. The host can then send the meeting identifier (and access control information) to each of the invitees, such as by email. Once the meeting is started, the invitees can then access and join the meeting using the meeting identifier and any provided access control information.

People participate in video conferences for a wide variety of reasons, such as to keep in touch with family, conduct business, or manage groups or organizations. In some cases, participants in a video conference may wish to keep the contents of the video conference confidential and only available to certain authorized personnel. However, malicious actors may try to infiltrate or hijack a meeting, for example to steal information, spy on the meeting, or sabotage the meeting. One way in which malicious actors infiltrate videoconferencing meetings is through man-in-the-middle attacks. A man-in-the-middle attack can involve an attacker intercepting communications between participants of a videoconferencing meeting to secretly eavesdrop on or modify the communications.

In the context of videoconferencing meetings, a man-in-the-middle attack can occur in a variety of ways. For example, an attacker may attempt to intercept videoconferencing data (e.g., video, audio, and chat data) by hijacking or impersonating a videoconferencing server so that the videoconferencing data transmitted through the server is accessible to the attacker. To help conceal the videoconferencing data from such an attack, some videoconferencing software encrypts the videoconferencing data using a meeting key (e.g., a symmetric cryptographic key) to implement end-to-end encryption between the client devices participating in the meeting. The meeting key is generated by the meeting host's client device and distributed to the other participants' client devices at the beginning of the meeting, so that the client devices can encrypt and decrypt the videoconferencing data. While this end-to-end encryption generally works well to secure videoconferences, some sophisticated attackers have found ways to breach the end-to-end encryption. These attackers may not only hijack or impersonate a videoconferencing server, but also take the next step of impersonating the meeting host that generates and distributes the meeting key. In particular, the attacker can transmit a message to the participants' devices that appears to be the host's public key, but is in fact the attacker's public key. If the attacker's public key is accepted by the participants' devices, the attacker has successfully impersonated the host. At that point, the attacker can distribute its own meeting key for the participants' devices to use in the end-to-end encryption, enabling the attacker to decrypt and access the videoconferencing data. Since all of this happens on the client devices and behind the scenes to the meeting participants, they may be unaware that the attacker has successfully impersonated the host and distributed an insecure meeting key that allows their communications to be intercepted.

To provide greater security for videoconferencing meetings, some examples of the present disclosure provide a security verification process through which meeting participants can more readily detect infiltration of the meeting by an unauthorized user to reduce the efficacy of man-in-the-middle attacks and other attacks. The security verification process can begin with the meeting participants using their client devices to generate security codes. The client devices can each generate a security code based on a public key of an asymmetric key pair corresponding to (e.g., assigned to) a leader of the meeting. The client devices may retrieve the public key from a key management system associated with the video conference provider to generate the security codes. In addition to using the public key, the client devices may also use additional information such as handshake data to generate the security codes. The handshake data can include any data transmitted between the client devices and a videoconferencing server during a handshake to engage in the meeting.

Next, the participants compare their security codes to one another to identify any deviations between the security codes. The participants can compare their security codes using any suitable communications medium, including communications mediums that are internal or external the meeting. For example, the participants can each read their security code out loud to one another during the meeting, text message their security codes to one another, and/or e-mail their security codes to one another. If all of the security codes match one another, then the meeting can be considered secure. If one of the security codes deviates from the other security codes, then the meeting may be considered insecure. For example, if the leader's security code is different from one of the other participants' security codes, then an attacker may have successfully impersonated the host and distributed an insecure meeting key that renders the meeting insecure.

Upon discovering a deviation between the security codes, the participants in the meeting can take any suitable corrective action. For example, the leader may remove (e.g., eject) whichever participants have a divergent security code from the meeting. As another example, the leader can shutdown and/or restart the meeting. As yet another example, the participants can voluntarily leave the meeting and try to reconnect in a more secure manner. Taking such corrective action can prevent further meeting communications from being intercepted by the attacker.

The security verification process described above can be repeated each time the leader of the meeting changes. For example, the client devices can detect that the leader of the meeting changed. The client devices may detect that the leader changed based on one or more notifications from a video conference provider indicating that the leader changed. In response to detecting that the leader changed, the client devices can receive a public key of an asymmetric key pair corresponding to the new leader of the meeting. The client devices can then generate new security codes based on the public key assigned to the new leader and output the new security codes to the participants. The participants can compare the new security codes to one another using any suitable communications medium to identify discrepancies. If the participants discover a discrepancy between the new security codes, they can take corrective action. Otherwise, the participants can proceed with the meeting. By performing the security verification process each time the meeting leader changes, it can prevent a compromised videoconferencing server from changing the meeting leader over the course of the meeting without being detected.

This illustrative example is given to introduce the reader to the general subject matter discussed herein and the disclosure is not limited to this example. The following sections describe various additional non-limiting examples.

Referring now to FIG. 1, FIG. 1 shows an example of a system 100 that provides videoconferencing functionality to various client devices. The system 100 includes a video conference provider 110 that is connected to multiple communication networks 120, 130, through which various client devices 140-180 can participate in video conferences hosted by the video conference provider 110. For example, the video conference provider 110 can be located within a private network to provide video conferencing services to devices within the private network, or it can be connected to a public network, e.g., the Internet, so it may be accessed by anyone. Some examples may even provide a hybrid model in which a video conference provider 110 may supply components to enable a private organization to host private internal video conferences or to connect its system to the video conference provider 110 over a public network.

The system 100 optionally also includes one or more user identity providers such as user identity provider 115 that can provide user identity services to users of the client devices 140-160 and may authenticate user identities of one or more users to the video conference provider 110. In this example, the user identity provider 115 is operated by a different entity than the video conference provider 110, though in some examples, they may be the same entity.

Video conference provider 110 allows clients to create videoconference meetings (or "meetings") and invite others to participate in those meetings as well as perform other related functionality, such as recording the meetings, generating transcripts from meeting audio, manage user functionality in the meetings, enable text messaging during the meetings, create and manage breakout rooms from the main meeting, etc. A more detailed description of the architecture and functionality of the video conference provider 110 is provided later on with respect to FIG. 2.

In some examples, the video conference provider 110 provides meetings in virtual "rooms" to which participants are connected. A room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used. Further, in some examples, and as alluded to above, a meeting may also have "breakout" rooms. Such breakout rooms may also be rooms that are associated with a "main" videoconference room. Thus, participants in the main videoconference room may exit the main room into a breakout room for any suitable reason, such as to discuss a particular topic, before returning to the main room. The breakout rooms in this example are discrete meetings that are associated with the meeting in the main room. However, to join a breakout room, a participant may first need to enter the main room. A room may have any number of associated breakout rooms according to various examples.

To create a meeting with the video conference provider 110, a user may contact the video conference provider 110 using one of the client devices 140-180. This user may be referred to herein as the meeting "host" or "leader". The host can select an option to create a new meeting. Such an option may be provided in a webpage accessed by a client device 140-160 or client application executed by a client device 140-160. For telephony devices, the host may be presented with an audio menu that they may navigate by pressing numeric buttons on their telephony device. To create the meeting, the video conference provider 110 may prompt the meeting host for certain information, such as a date, time, and duration for the meeting, a number of participants, a type of encryption to use, whether the meeting is confidential or open to the public, etc. After receiving the various meeting settings, the video conference provider may create a record for the meeting and generate a meeting identifier and, in some examples, a corresponding meeting password or passcode (or other authentication information), all of which meeting information is provided to the host.

After receiving the meeting information, the host may distribute the meeting information to one or more other users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating the that meeting has not yet started or the host may be required to specifically admit one or more of the users.

During the meeting, the participants may employ their client devices 140-180 to capture audio or video information and stream that information to the video conference provider 110. They also receive audio or video information from the video conference provider 210, which is displayed by the respective client devices 140-170 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting and they will no longer receive audio or video streams for the meeting (and will stop transmitting audio or video streams). The video conference provider 110 may also invalidate the meeting information, such as the meeting identifier or password/passcode.

To provide such functionality, one or more client devices 140-180 may communicate with the video conference provider 110 using one or more communication networks, such as network 120 or the public switched telephone network ("PSTN") 130. The client devices 140-180 may be any suitable computing or communications device that have audio or video capability. For example, client devices 140-160 may be conventional computing devices, such as desktop or laptop computers having processors and computer-readable media, connected to the video conference provider 110 using the Internet or other suitable computer network.

Suitable networks include the Internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the video conference provider 110.

In addition to the computing devices discussed above, client devices 140-180 may also include one or more telephony devices, such as cellular telephones (e.g., cellular telephone 170), Internet protocol ("IP") phones (e.g., telephone 180), or conventional telephones. Such telephony devices may allow a user to make conventional telephone calls to other telephony devices using the PSTN, including the video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and is not limited solely to dedicated telephony devices like conventional telephones.

Referring again to client devices 140-160, these client devices 140-160 contact the video conference provider 110 using network 120 and may provide information to the video conference provider 110 to access functionality provided by the video conference provider 110, such as access to create new meetings or join existing meetings. To do so, the client devices 140-160 may provide user identification information, meeting identifiers, meeting passwords or passcodes, etc. In examples that employ a user identity provider 115, a client device such as client devices 140-160 may operate in conjunction with a user identity provider 115 to provide user identification information or other user information to the video conference provider 110.

A user identity provider 115 may be any entity trusted by the video conference provider 110 that can help identify a user to the video conference provider 110. For example, a trusted entity may be a server operated by a business or other organization and with whom the user has established their identity, such as an employer or trusted third-party. The user may sign into the user identity provider 115, such as by providing a username and password, to access their identity at the user identity provider 115. The identity, in this sense, is information established and maintained at the user identity provider 115 that can be used to identify a particular user, irrespective of the client device they may be using. An example of an identity may be an email account established at the user identity provider 115 by the user and secured by a password or additional security features, such as biometric authentication, two-factor authentication, etc. However, identities may be distinct from functionality such as email. For example, a health care provider may establish identities for its patients. And while such identities may have associated email accounts, the identity is distinct from those email accounts. Thus, a user's "identity" relates to a secure, verified set of information that is tied to a particular user and should be accessible only by that user. By accessing the identity, the associated user may then verify themselves to other computing devices or services, such as the video conference provider 110.

When the user accesses the video conference provider 110 using a client device, the video conference provider 110 communicates with the user identity provider 115 using information provided by the user to verify the user's identity. For example, the user may provide a username or cryptographic signature associated with a user identity provider 115. The user identity provider 115 then either confirms the user's identity or denies the request. Based on this response, the video conference provider 110 either provides or denies access to its services, respectively.

In some examples, users of the video conference provider 110 can each be assigned a unique asymmetric key-pair, which may be maintained by the user's client device or a key management system 190. The key management system 190 can be part of the user identity provider 115, the video conference provider 110, or located elsewhere in the system 100. The key management system 190 can generate, store, and/or manage the asymmetric key pairs assigned to users of the video conference provider 110.

The asymmetric key pair includes a public key and a private key. The private key is generally kept secret (e.g., kept internal to the client device or the key management system) and may not be exposed to the corresponding user and/or other users. In some examples, the asymmetric key pairs are used to perform one or more authentication processes relating to participating in a videoconferencing meeting. For example, the asymmetric key pairs can be used during handshakes between the client devices 140-180 and the video conference provider 110 to authenticate users to access videoconferencing meetings. Other information may also be exchanged between the client devices 140-180 and the video conference provider 110 during such handshakes. Information exchanged during such handshakes can be referred to herein as handshake data. Examples of handshake data include a passcode, a meeting identifier that uniquely identifies a meeting, a public key of an asymmetric key pair assigned to a user of a client device, a device identifier that uniquely identifies a client device, a user identifier that uniquely identifies the user, a digital certificate, or any combination of these.

For telephony devices such as client devices 170-180, the user may place a telephone call to the video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphones and speakers, even if video capabilities are not provided by the telephony device.

Because telephony devices typically have more limited functionality than conventional computing devices, they may be unable to provide certain information to the video conference provider 110. For example, telephony devices may be unable to provide user identification information to identify the telephony device or the user to the video conference provider 110. Thus, the video conference provider 110 may provide more limited functionality to such telephony devices. For example, the user may be permitted to join a meeting after providing meeting information, e.g., a meeting identifier and passcode, but they may be identified only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide user identification information to the video conference provider 110, even in cases where the user has an authenticated identity and employs a client device capable of identifying the user to the video conference provider 110. The video conference provider 110 may determine whether to allow such anonymous users to use services provided by the video conference provider 110. Anonymous users, regardless of the reason for anonymity, may be restricted as discussed above with respect to users employing telephony devices, and in some cases may be prevented from accessing certain meetings or other services, or may be entirely prevented from accessing the video conference provider 110.

Referring again to video conference provider 110, in some examples, it may allow client devices 140-160 to encrypt their respective video and audio streams to help improve privacy in their meetings. Encryption may be provided between the client devices 140-160 and the video conference provider 110 or it may be provided in an end-to-end configuration where multimedia streams transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the video conference provider 110, while allowing the video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the video conference provider 110. Further, such a system enables users to use a wide variety of different client devices 140-180 from traditional standards-based video conferencing hardware to dedicated video conferencing equipment to laptop or desktop computers to handheld devices to legacy telephony devices, etc.

To engage in some or all of the functionality described herein, the client devices 140-180 may include videoconferencing software 195. Although the videoconferencing software 195 is shown in FIG. 1 as only being on client device 140 for simplicity, it will be appreciated that some or all of the other client devices 150-180 may also include the videoconferencing software 195. An example of the videoconferencing software 195 can be Zoom® by Zoom Video Communications Inc.®. The videoconferencing software 195 can implement a security verification process to help secure videoconferencing meetings. For example, the videoconferencing software 195 can receive a public key 199 of an asymmetric key pair corresponding to a leader of a videoconferencing meeting, generate a security code 197 based on the public key 199 (e.g., by hashing the public key 199), and output the security code on a display device. An example of this process is described in greater detail later on.

Figure 2:
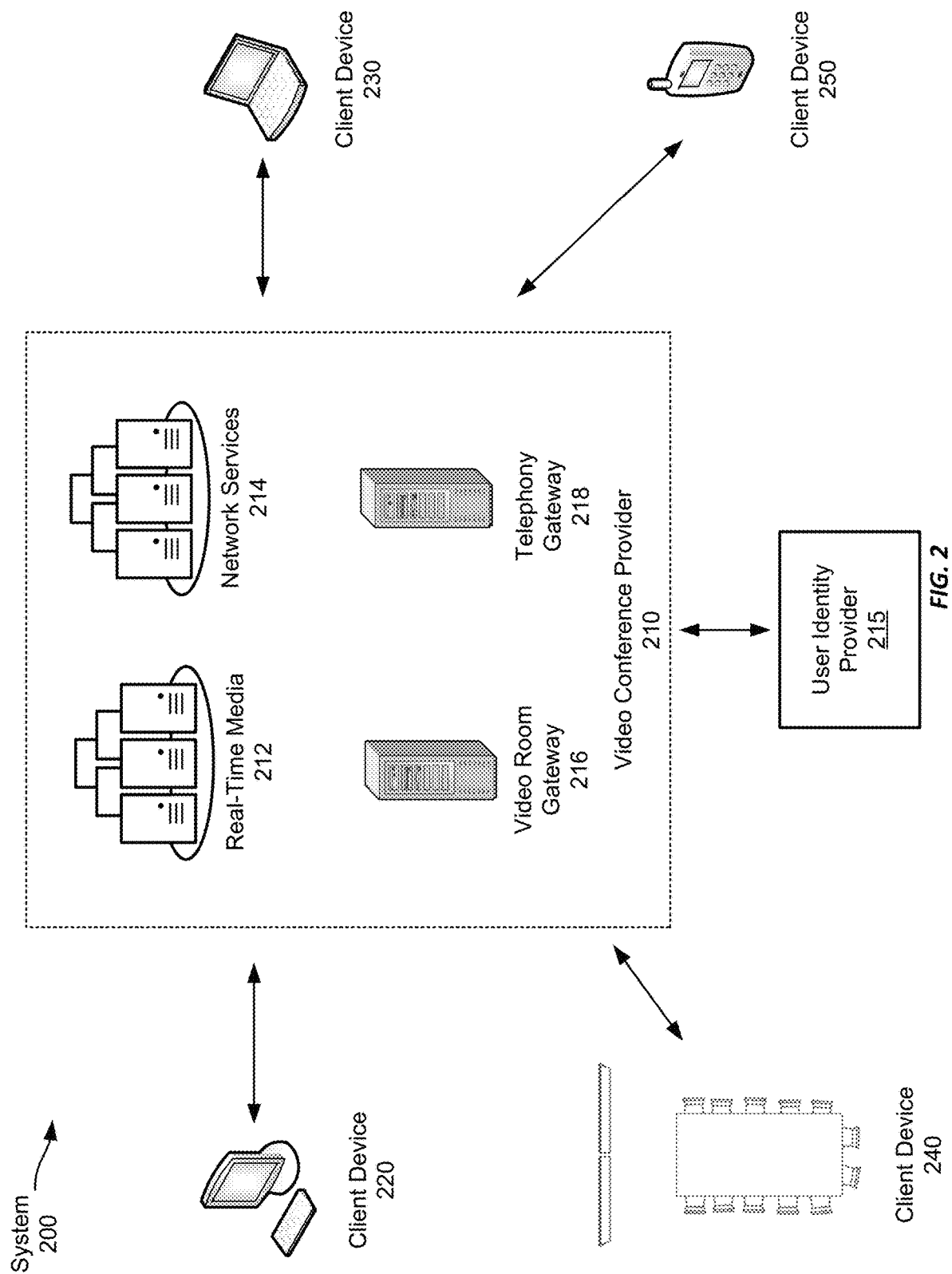

Referring now to FIG. 2, FIG. 2 shows an example of a system 200 in which a video conference provider 210 provides videoconferencing functionality to various client devices 220-250. The client devices 220-250 include two computing devices 220-230, dedicated equipment for a video conference room 240, and a telephony device 250. Each client device 220-250 communicates with the video conference provider 210 over a communications network, such as the Internet for client devices 220-240 or the PSTN for client device 250, generally as described above with respect to FIG. 1. The video conference provider 210 is also in communication with one or more user identity providers 215, which can authenticate various users to the video conference provider 210 generally as described above with respect to FIG. 1.

In this example, the video conference provider 210 employs multiple different servers (or groups of servers) to provide different aspects of video conference functionality, thereby enabling the various client devices to create and participate in video conference meetings. The video conference provider 210 uses one or more real-time media servers 212, one or more network services servers 214, one or more video room gateway servers 216, and one or more telephony gateway servers 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from client devices 230-250 and provide the multiplexed streams to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency, and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the video conference provider 210. In some such examples, the real-time media servers 212 may decrypt incoming multimedia streams, multiplex the multimedia streams appropriately for the various clients, and encrypt the multiplexed streams for transmission.

In some examples, to provide multiplexed streams, the video conference provider 210 may receive multimedia streams from the various participants and publish those streams to the various participants to subscribe to and receive. Thus, the video conference provider 210 notifies a client device (e.g., client device 220) about various multimedia streams available from the other client devices 230-250, and the client device 220 can select which multimedia stream(s) to subscribe to and receive. In some examples, the video conference provider 210 may provide to each client device the available streams from the other client devices, but from the respective client device itself, though in other examples it may provide all available streams to all available client devices. Using such a multiplexing technique, the video conference provider 210 may enable multiple different streams of varying quality, thereby allowing client devices to change streams in real-time as needed, for example based on network bandwidth, latency, etc.

As mentioned above with respect to FIG. 1, the video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the video conference provider 210 may allow a meeting participant to notify it of inappropriate behavior or content in a meeting. Such a notification may trigger the real-time media servers to 212 record a portion of the meeting for review by the video conference provider 210. Still other functionality may be implemented to take actions based on the decrypted multimedia streams at the video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, such as at a business or other organization. For example, different geographic regions may each have one or more real-time media servers 212 to enable client devices in the same geographic region to have a high-quality connection into the video conference provider 210 via local servers 212 to send and receive multimedia streams, rather than connecting to a real-time media server located in a different country or on a different continent. The local real-time media servers 212 may then communicate with physically distant servers using high-speed network infrastructure, such as Internet backbone networks, that otherwise might not be directly available to client devices 220-250 themselves. Thus, routing multimedia streams may be distributed throughout the video conference provider 210 and across many different real-time media servers 212.

Turning to the network services servers 214, the network services servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, such as for specific regions or localities, to manage portions of the video conference provider under a supervisory set of servers. When a client device 220-250 accesses the video conference provider 210, it will typically communicate with one or more network services servers 214 to access their account or to participate in a meeting.

When a client device 220-250 first contacts the video conference provider 210 in this example, it is routed to a network services server 214. The client device may then provide access credentials for a user, e.g., a username and password or single sign-on credentials, to gain authenticated access to the video conference provider 210. This process may involve the network services servers 214 contacting a user identity provider 215 to verify the provided credentials. Once the user's credentials have been accepted, the client device may perform administrative functionality, like updating user account information, if the user has an identity with the video conference provider 210, or scheduling a new meeting, by interacting with the network services servers 214.

In some examples, users may access the video conference provider 210 anonymously. When communicating anonymously, a client device 220-250 may communicate with one or more network services servers 214 but only provide information to create or join a meeting, depending on what features the video conference provider allows for anonymous users. For example, an anonymous user may access the video conference provider using client 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, creating sub-meetings or "break-out" rooms, recording meetings, etc. Such functionality may be managed by the one or more network services servers 214.

For example, if a host wishes to remove a user from a meeting, they may identify the user and issue a command through a user interface on their client device. The command may be sent to a network services server 214, which may then disconnect the identified user from the corresponding real-time media server 212. If the host wishes to create a break-out room for one or more meeting participants to join, such a command may also be handled by a network services server 214, which may create a new meeting record corresponding to the break-out room and then connect one or more meeting participants to the break-out room similarly to how it originally admitted the participants to the meeting itself.

In addition to creating and administering on-going meetings, the network services servers 214 may also be responsible for closing and tearing-down meetings once they have completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services servers 214 may deny the request.

Depending on the functionality provided by the video conference provider, the network services servers 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, the video room gateway servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the video conference provider 210. For example, the video conferencing hardware may be provided by the video conference provider to one or more of its subscribers, which may provide access credentials to the video conferencing hardware to use to connect to the video conference provider 210.

The video room gateway servers 216 provide specialized authentication and communication with the dedicated video conferencing hardware that may not be available to other client devices 220-230, 250. For example, the video conferencing hardware may register with the video conference provider 210 when it is first installed and the video room gateway servers 216 may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the video conference provider 210.

Referring now to the telephony gateway servers 218, these servers 218 enable and facilitate telephony devices' participation in meetings hosed by the video conference provider 210. Because telephony devices communicate using the PSTN and not using computer networking protocols, such as TCP/IP, the telephony gateway servers 218 act as an interface that converts between the PSTN and the networking system used by the video conference provider 210.

For example, if a user uses a telephony device to connect to a meeting, they may dial a phone number corresponding to one of the video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio signals to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server 218 is instead joined to the meeting on the telephony device's behalf.

After joining the meeting, the telephony gateway server 218 receives an audio stream from the telephony device and provides it to the corresponding real-time media server 212, and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

Figure 3:
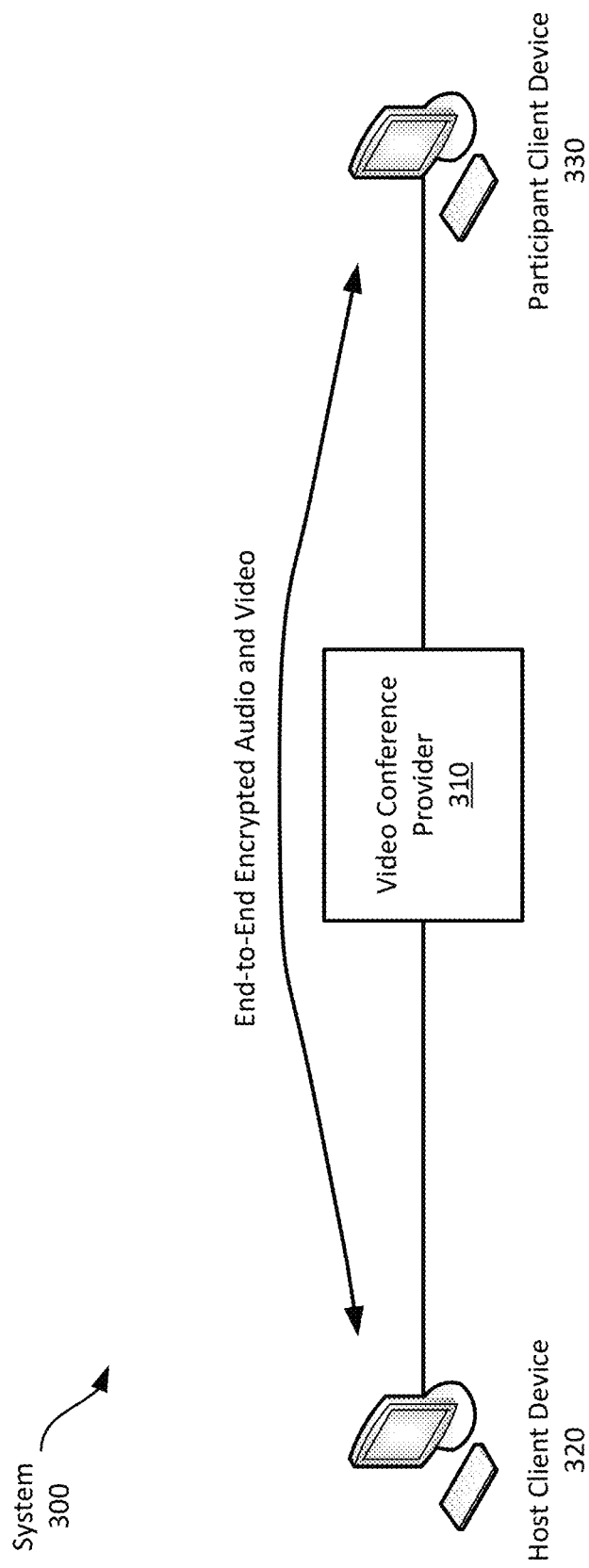

Referring now to FIG. 3, FIG. 3 illustrates a simplified system 300 that enables the users to engage in an end-to-end ("E2E") encrypted video conference. The system includes two client devices 320, 330 and a video conference provider 310. The client devices 320, 330 are connected to the video conference provider 310 through one or more communication networks (not shown), generally as described above with respect to FIGS. 1-2.

In an E2E-encrypted video conference, each participant joins the video conference with their respective client device 320-330 and the host establishes a meeting key, e.g., a symmetric cryptographic key, that will be used to encrypt and decrypt the audio and video streams. Each of the participants also has their own respective public/private key pair that can be used to communicate with the respective participant. Each participant's public key is published or distributed in any suitable manner, such as by registering it with a trusted entity or by generating a cryptographic signature using a private key and allowing the host or other participants to use a published copy of the public key to verify the signature.

Once each participant's public key has been verified, the host can securely distribute the meeting key to the participants by encrypting the meeting key using the participant's respective public keys. For example, the host may generate and send an encrypted message including the meeting key to each participant using the respective participant's public key. Upon receiving successfully decrypting the meeting key, the respective participants are then able to encrypt and decrypt meeting content.

In the system 300 shown in FIG. 3, client device 320 initially connects to the video conference provider 310 and requests that the video conference provider create a new meeting. Once the meeting is created, client device 320 is designated as the host of the meeting and establishes a meeting key to use to provide for E2E encryption in the meeting, but does not provide the meeting key to the video conference provider 310 (e.g., to prevent the video conference provider 310 from eavesdropping on the meeting).

Subsequently, a participant client device 330 joins the meeting and generates and provides a cryptographically signed message using its private key to the host client device 320, which verifies the message using the participant's public key. After verifying the public key, the host client device 320 encrypts the meeting key using the participant's public key and transmits it to the participant client device 330, which decrypts the meeting key. Once the meeting key has been successfully received and decrypted by the participant client device 330, it may begin transmitting encrypted audio and video using the meeting key.

In this example, each participant generates a per-stream encryption key by computing a new key using a non-secret stream ID for each data stream it transmits (e.g., audio and video), and uses the corresponding stream encryption key to encrypt its audio and video stream(s). The video conference provider 310 receives the various encrypted streams, multiplexes them generally as described above with respect to FIGS. 1-2, and distributes them to the various participating client devices 320, 330. The respective client devices 320, 330 can then use the meeting key to decrypt the incoming streams and view the content of the video conference.

In a typical scenario, the video conference provider 310 does not have access to the meeting key. So, the video conference provider 310 is unable to decrypt the various audio and video streams. But if an attacker has hijacked a server of the video conference provider 310 and has successfully impersonated the meeting host, the attacker can distribute an insecure meeting key to the participant client devices 320, 330 to allow the attacker to decrypt the audio and video streams. Since such security breaches are highly undesirable, some examples of the present disclosure provide for a security verification process that can help meeting participants detect this type of impersonation. An example of the security verification process is described below in with respect to FIG. 4.

Figure 4:
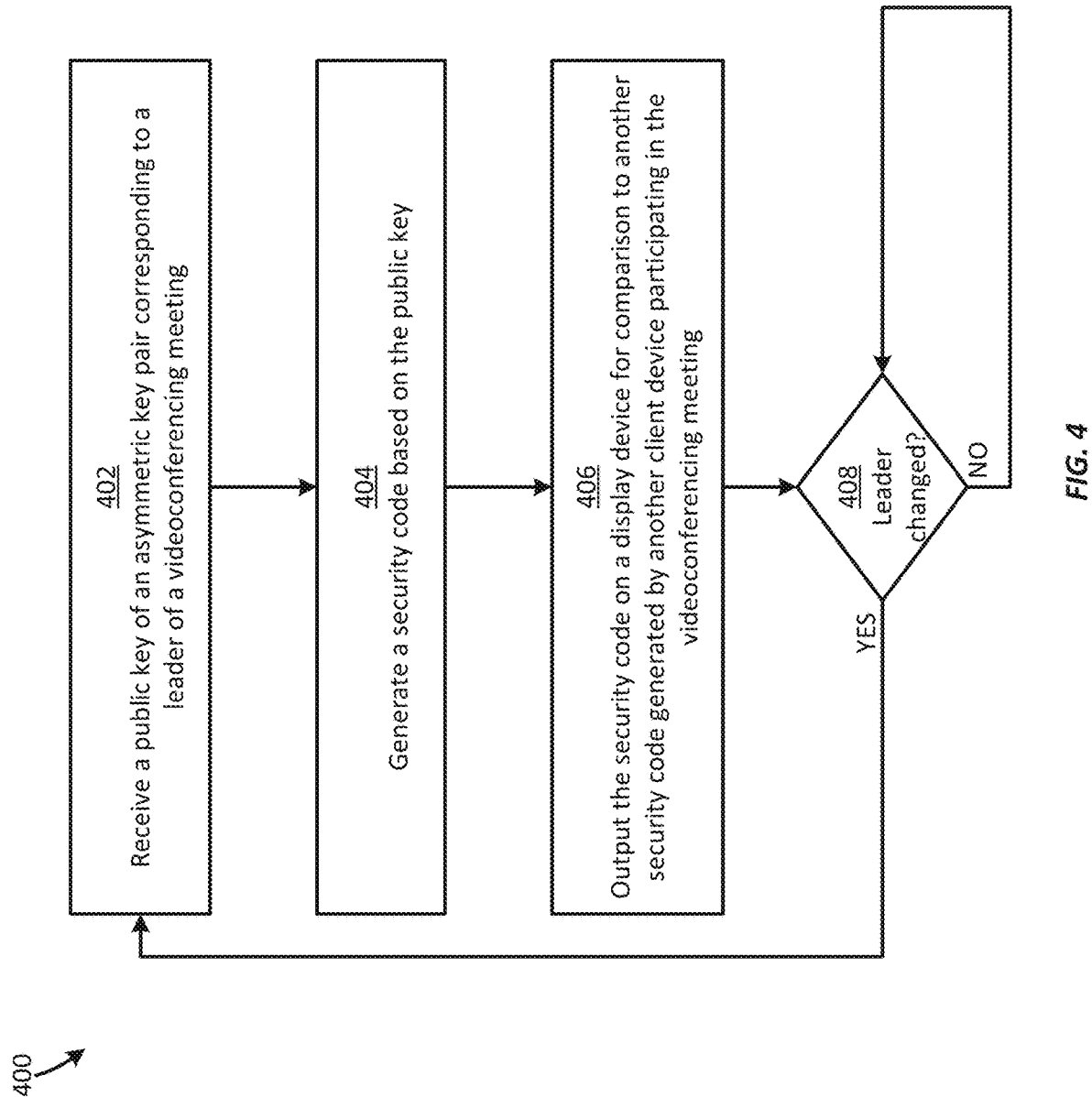
FIG. 4 shows an example of a process for securing videoconferencing meetings according to some aspects of the present disclosure.

FIG. 4 shows an example of a process 400 for securing videoconferencing meetings according to some aspects of the present disclosure. The process 400 is described below with respect to the client device 140 and the systems shown in FIGS. 1-2, but other examples may be employed with other computing devices or systems.

As noted above, users of the video conference provider 110 can each be assigned a unique asymmetric key-pair, which may be maintained by the user's client device or a key management system. These asymmetric key-pairs are used in the following process to help verify the security of a videoconferencing meeting.

In block 402, a client device 140 receives a public key of an asymmetric key pair corresponding to a leader of a videoconferencing meeting. In some examples, the client device 140 receives the public key from meeting leader's client device (the "leader device"). For instance, the client device 140 can request the public key from the leader device and receive the requested public key back from the leader device. Alternatively, the leader device can automatically transmit the public key to the client device 140 without an express request from the client device 140.

In other examples, the client device 140 receives the public key from the key management system. For instance, the client device 140 can transmit a request for the public key to the key management system and receive the requested public key back from the key management system. Alternatively, the key management system can automatically transmit the public key to the client device 140 without an express request from the client device 140.

In block 404, the client device 140 generates a security code based on the public key associated with the leader of the videoconferencing meeting. In some examples, the security code can be the same as the public key and generating the security code may involve using the public key as the security code. In other examples, the security code can be different from the public key and generating the security code may involve applying one or more functions (e.g., hashing functions, reversible compression functions, and substitution cipher functions) to the public key alone or in combination with other information, such as any of the handshake data described above. For example, the client device 140 can generate the security code at least in part by hashing the public key, alone or in combination with other information, using one or more hashing functions such as SHA-1, SHA-256, MD5, RIPEMD-160, BLAKE3, or Whirlpool. The function(s) used to generate the security code may be selected so that the security code is easy for humans to read and compare across different media, while still having a large enough amount of variability to minimize or prevent duplication of security codes for different meeting leaders.

In some examples, the client device 140 generates the security code by applying one or more functions to the public key and a predefined text string. For example, the client device 140 can apply a first function to the public key to generate a transformed key. The first function may be a first hash function so that the transformed key is a hashed key. The client device 140 can also apply a second function to a predefined text string to generate a transformed string. The second function may be a second hash function so that the transformed string is a hashed string. The second function may be the same as or different from the first function. Having determined the transformed key and the transformed string, the client device 140 then generates the security code based on the transformed key and the transformed string.

One example of the predefined text string can be "Zoom-base-1-ClientOnly-MAC-SecurityCode," but other text strings may be used. In some cases, the predefined text string may be the same for all meetings, so that the security code only changes based on the public key of a meeting leader. If the public key of a meeting leader remains the same across multiple meetings (e.g., the public key is relatively static), then the security code may also be the same across multiple meetings led by the same meeting leader. This can improve security and expedite the verification process, because users may already know the meeting leader's security code from previous videoconferencing meetings and expect to see the same code for the current videoconference meeting, thereby allowing users to more readily detect security code deviations. Alternatively, the predefined text string can depend on one or more factors that are specific to a meeting, so that different predefined text strings may be used in relation to different meetings. For example, the predefined text string can include a group identifier specifying a group or organization participating in the meeting, a meeting passcode, the date or start time of a meeting, a real name or username for a meeting leader, or any combination of these. Either way, all of the meeting participants may use the same predefined text string to generate the security code, so that the security codes match absent a security problem.

The client device 140 can determine the security code based on the transformed string and the transformed key in any number of ways, such as by combining or further transforming (e.g., hashing) the transformed key and the transformed string. For instance, the client device 140 can determine the security code by summing, subtracting, or concatenating the transformed key and the transformed string. As another example, the client device 140 can apply a third function to the transformed key and the transformed string to generate a transformed code. The third function may be a third hash function so that the transformed code is a hashed code. The third function may be the same as or different from the first function and/or the second function. The client device 140 can then generate the security code based on the transformed code. One example of this process can be represented as:

Security code=Digits(SHA256(SHA256(predefined_text_string)∥SHA256(pub_key))

where SHA256 is a hash function, "predefined_text_string" corresponds to the predefined text string mentioned above, "pub_key" corresponds to the public key of the meeting leader, and Digits is an optional function to extract a predefined number of decimal digits from the hash code. In this example, the security code is a set of decimal digits (e.g., 39 decimal digits representing just over 129 bits of information) that may be more human-readable and digestible than the full hexadecimal hash, which may improve the user experience. Of course, other functions and techniques may be used (in addition to or instead of the Digits function) to generate a security code that is in a more human-readable and digestible format than a full hexadecimal hash.

In block 406, the client device 140 outputs the security code on a display device. A user of the client device 140 can compare the output security code to another security code generated by another client device that is participating in the videoconferencing meeting to verify whether the videoconferencing meeting is secure. In particular, the user can receive the other security code via any suitable communications medium, such through the meeting itself (e.g., as speech in an audio stream of the meeting) or through an out-of-band channel that is external to the meeting (e.g., a phone call, text message, or e-mail). The user can then compare the two security codes to identify any discrepancies between the two. If the user identifies a discrepancy between the two security codes, it may mean that the meeting is compromised, so the user can take corrective action. This may involve notifying one or more of the other meeting participants (e.g., the leader) to take corrective action. If the security codes match one another, it may mean that the meeting has not been compromised and may be considered secure. So, the meeting may carry on as scheduled.

Additionally or alternatively, the user of the client device 140 can provide the security code to other participants of the meeting so that they can verify that the meeting is secure. For example, the user can provide (e.g., via text message, e-mail, a chat message, or spoken audio) the security code to one or more other participants of the meeting so that they can compare the security code to their own security codes generated by their respective client devices. In one such example, the user can speak the security code into a microphone associated with the client device 140. The client device 140 can receive the audio input from the microphone and transmit (e.g., directly or indirectly, such as through the video conference provider 110) the audio input to one or more other client devices associated with one or more other meeting participants. The client device 140 can transmit the audio input to the other meeting participants as part of the meeting's audio stream or externally to the meeting. The other meeting participants can receive the security code and compare it to their respective security codes to identify any discrepancies between the two. If one or more of the other participants identify a discrepancy, it may mean that the meeting is compromised and appropriate corrective action may be taken.

In block 408, the client device 140 determines if the leader of the meeting changed. In some examples, the video conference provider 110 can transmit notifications to the client devices 140-180 participating in the videoconferencing meeting each time the leader changes. The client device 140 can receive such notifications and responsively determine that the leader has changed (e.g., from a first user to a second user). If the client device 140 determines that the leader of the meeting changed, the process 400 can return to block 402 and repeat for the new leader, so that a new security code is generated and output based on a public key of the new leader. Otherwise, the process 400 can remain at block 408 (e.g., until the meeting ends) to await a change of the meeting leader.

Figure 5:
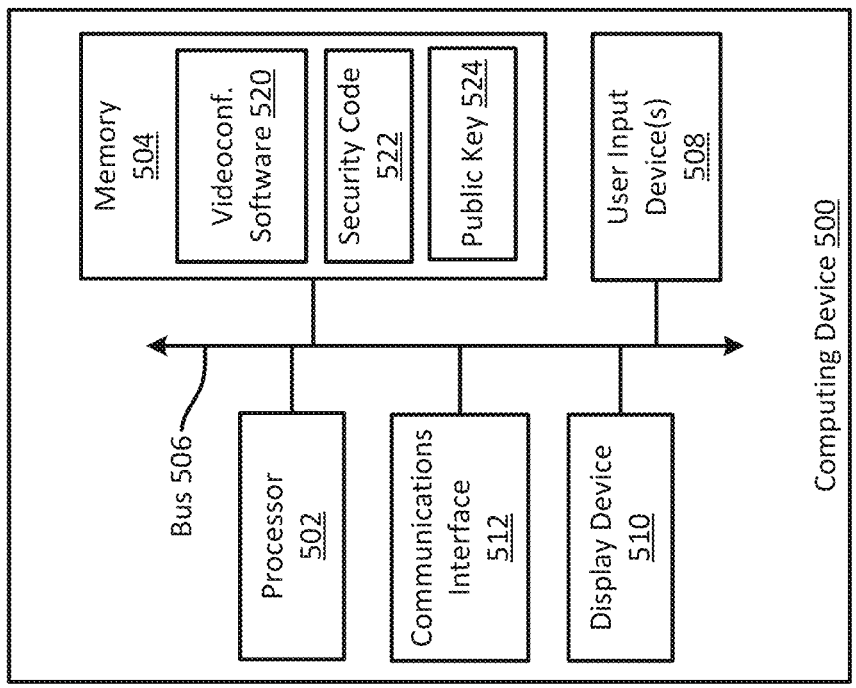
FIG. 5 shows an example of a computing device usable to secure videoconferencing meetings according to some aspects of the present disclosure.

Some or all of the process 400 described above may be implemented using a computing device, such as the computing device 500 of FIG. 5. The computing device 500 may correspond to the client device 140 described above. The computing device 500 includes a processor 502 that is in communication with the memory 504 and other components of the computing device 500 using one or more communications buses 506. The processor 502 is configured to execute processor-executable instructions stored in the memory 504 to perform one or more processes for securing videoconferencing meetings. In some examples, the instructions can form part of videoconferencing software 520, which may be similar to the videoconferencing software 195 of FIG. 1. An example of the videoconferencing software 195 can be Zoom® by Zoom Video Communications Inc.®. The videoconferencing software 520 can implement some or all of the process 400 described above. For example, the videoconferencing software 520 can be executed by the processor 502 to receive a public key 524 of an asymmetric key pair corresponding to a leader of a videoconferencing meeting, generate a security code 522 based on (e.g., at least in part by hashing) the public key 524, and output the security code 522 on a display device 510.

As shown, the computing device 500 also includes one or more user input devices 508 (e.g., keyboard, mouse, touchscreen, video capture device, and/or microphone) to accept user input and the display device 510 to provide visual output to a user.

The computing device 500 further includes a communications interface 512. In some examples, the communications interface 512 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a videoconferencing server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations thereof in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

What is claimed is:
1. A client device comprising:
a display device;
a processor communicatively coupled to the display device; and a non-transitory computer-readable medium comprising program code for a videoconferencing application that is executable by the processor to cause the client device to:
  join a videoconferencing meeting in which there is end-to-end encryption between client devices participating in the videoconferencing meeting, wherein the end-to-end encryption is implemented by the client devices using a meeting key provided by a host of the videoconferencing meeting;
  after joining the videoconferencing meeting, receive a public key of an asymmetric key pair corresponding to the host of the videoconferencing meeting, the public key being different from the meeting key;
  generate a security code based on the public key;
  output the security code on the display device for comparison to another security code generated by another client device participating in the videoconferencing meeting to verify that the videoconferencing meeting is secure;
  receive encrypted videoconferencing data from one or more of the client devices participating in the videoconferencing meeting; and
  decrypt the encrypted videoconferencing data using the meeting key and output the decrypted videoconferencing data on the display device.

2. The client device of claim 1, wherein a discrepancy between the security code and the other security code is indicative of a cybersecurity vulnerability relating to the videoconferencing meeting.

3. The client device of claim 1, wherein the videoconferencing application is further executable by the processor to, subsequent to outputting the security code:
  receive an audio input from a microphone associated with the client device, the audio input indicating the security code; and
  transmit the audio input to the other client device.

4. The client device of claim 1, wherein the videoconferencing application is further executable by the processor to generate the security code at least in part by:
  applying a first function to the public key to generate a transformed key;
  applying a second function to a predefined text string to generate a transformed string;
  applying a third function to the transformed key and the transformed string to generate a transformed code; and
  generating the security code based on the transformed code.

5. The client device of claim 4, wherein the videoconferencing application is further executable by the processor to generate the security code based on the transformed code at least in part by extracting a predefined number of decimal digits from the transformed code, the predefined number of decimal digits serving as the security code.

6. The client device of claim 4, wherein the first function, the second function, and the third function are a same function.

7. The client device of claim 1, wherein the videoconferencing application is further executable by the processor to:
  perform a handshake with a video conference provider to access the videoconferencing meeting, wherein the handshake involves handshake data being transmitted between the client device and the video conference provider; and
  generate the security code based at least in part on the public key and the handshake data.

8. The client device of claim 7, wherein the handshake data includes another public key associated with a user of the client device, a unique identifier of the videoconferencing meeting, or a passcode.

9. The client device of claim 1, wherein the videoconferencing application is further executable by the processor to:
  request the public key from a key management system that is separate from the client device; and
  receive the public key from the key management system.

10. The client device of claim 1, wherein the public key is a first public key, the asymmetric key pair is a first asymmetric key pair, and the videoconferencing application is further executable by the processor to:
  determine that the host of the videoconferencing meeting has changed from a first user to a second user; and
  in response to determining that the host of the videoconferencing meeting has changed:
    determine a second public key of a second asymmetric key-pair corresponding to the second user;
    generate a new security code based on the second public key; and
    output the new security code on the display device for comparison to an additional security code generated by at least one other client device participating in the videoconferencing meeting to verify that the videoconferencing meeting is secure.

11. A method comprising:
  joining, by a client device, a videoconferencing meeting in which there is end-to-end encryption between client devices participating in the videoconferencing meeting, wherein the end-to-end encryption is implemented by the client devices using a meeting key provided by a host of the videoconferencing meeting;
  after joining the videoconferencing meeting, receiving, by the client device, a public key of an asymmetric key pair corresponding to the host of the videoconferencing meeting, the public key being different from the meeting key;
  generating, by the client device, a security code based on the public key;
  outputting, by the client device, the security code on a display device for comparison to another security code generated by another client device participating in the videoconferencing meeting to verify that the videoconferencing meeting is secure;
  receiving, by the client device, encrypted videoconferencing data from one or more of the client devices participating in the videoconferencing meeting; and
  decrypting, by the client device, the encrypted videoconferencing data using the meeting key and outputting the decrypted videoconferencing data on the display device.

12. The method of claim 11, wherein the client device is not operated by the host of the videoconferencing meeting, and wherein the other client device is operated by the host of the videoconferencing meeting.

13. The method of claim 11, wherein the client device is operated by the host of the videoconferencing meeting, and wherein the other client device is not operated by the host of the videoconferencing meeting.

14. The method of claim 11, further comprising generating the security code by hashing the public key.

15. The method of claim 14, wherein generating the security code includes:
  applying a first hash function to the public key to generate a hashed key;

applying a second hash function to a predefined text string to generate a hashed string;

applying a third hash function to the hashed key and the hashed string to generate a hash code; and generating the security code based on the hash code.

16. The method of claim 11, wherein the security code is different from the public key.

17. The method of claim 11, further comprising:

performing, by the client device, a handshake with a video conference provider to access the videoconferencing meeting, wherein the handshake involves handshake data being transmitted between the client device and the video conference provider; and generating, by the client device, the security code based at least in part on the public key and the handshake data.

18. The method of claim 17, wherein the handshake data includes another public key associated with a user of the client device, a unique identifier of the videoconferencing meeting, or a passcode.

19. The method of claim 11, wherein the public key is a first public key, the asymmetric key pair is a first asymmetric key pair, and further comprising:

determining that the host of the videoconferencing meeting has changed from a first user to a second user; and in response to determining that the host of the videoconferencing meeting has changed:

determining a second public key of a second asymmetric key-pair corresponding to the second user;

generating a new security code at least in part by hashing the second public key; and outputting the new security code on the display device for comparison to an additional security code generated by at least one other client device participating in the videoconferencing meeting to verify that the videoconferencing meeting is secure.

20. A non-transitory computer-readable medium comprising program code that is executable by a processor of a client device to cause the client device to:

join a videoconferencing meeting in which there is end-to-end encryption between client devices participating in the videoconferencing meeting, wherein the end-to-end encryption is implemented between the client devices using a meeting key provided by a host of the videoconferencing meeting;

after joining the videoconferencing meeting, receive a public key of an asymmetric key pair corresponding to the host of the videoconferencing meeting, the public key being different from the meeting key;

generate a security code based on the public key;

output the security code on a display device for comparison to another security code generated by another client device participating in the videoconferencing meeting to verify that the videoconferencing meeting is secure;

receive encrypted videoconferencing data from one or more of the client devices participating in the videoconferencing meeting; and decrypt the encrypted videoconferencing data using the meeting key and output the decrypted videoconferencing data on the display device.

* * * * *